United States Patent [19]

Watson

[11] 4,067,265
[45] Jan. 10, 1978

[54] DISPLAY RACK

[76] Inventor: James C. Watson, 6 Crestview Drive, Westboro, Mass. 01581

[21] Appl. No.: 718,181

[22] Filed: Aug. 27, 1976

[51] Int. Cl.² ............................................. A47F 5/12
[52] U.S. Cl. ...................................... 108/7; 211/150; 280/79.3
[58] Field of Search ............... 211/150, 149, 130, 131, 211/168, 170–174, 134; 188/5; 280/79.1, 79.2, 79.3, 43.24, 762, 761; 248/188.1, 188.8, 188.2, 188.5; 108/6–8; 182/15, 17, 109

[56] References Cited

U.S. PATENT DOCUMENTS

| 1,605,291 | 11/1926 | Schmidt | 188/5 |
| 3,111,915 | 11/1963 | Gray | 211/150 X |
| 3,981,511 | 9/1976 | Foster | 280/79.3 |

Primary Examiner—Roy D. Frazier
Assistant Examiner—Terrell P. Lewis, Jr.
Attorney, Agent, or Firm—Norman S. Blodgett; Gerry A. Blodgett

[57] ABSTRACT

Display rack having tray supports which tilt from a horizontal transport position to an inclined display position and in which the movement of the racks from the first to the second position actuates a brake to lock the rack in place on the floor.

6 Claims, 7 Drawing Figures

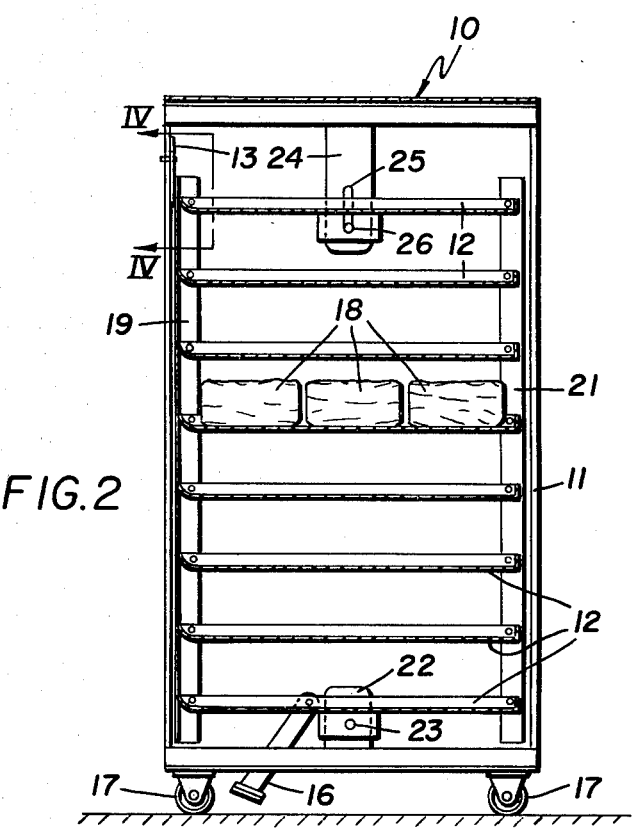
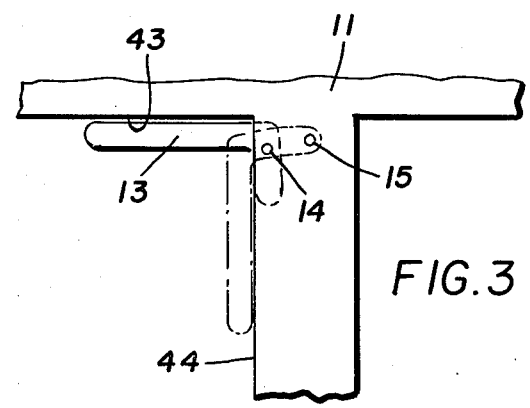

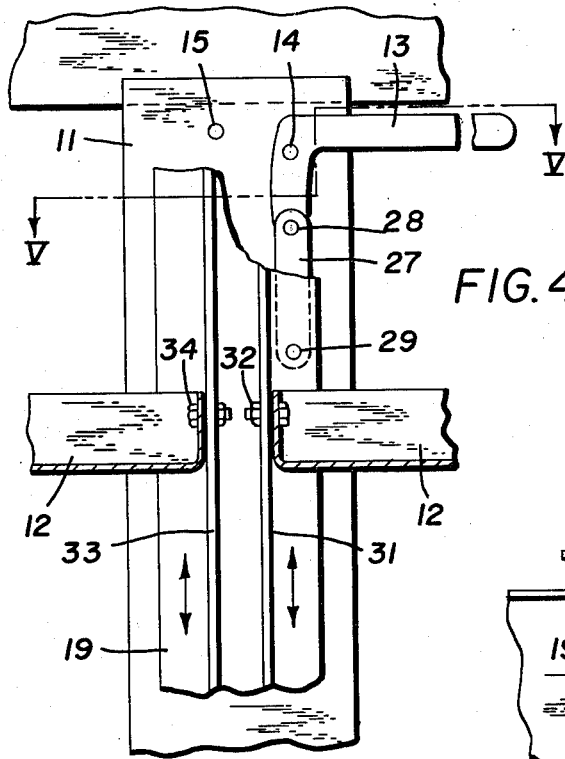
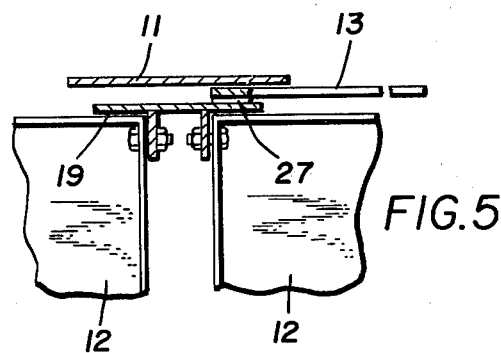
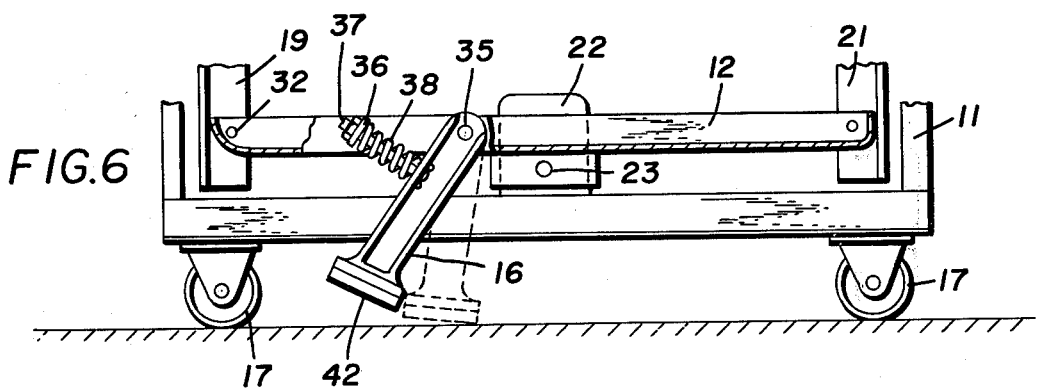
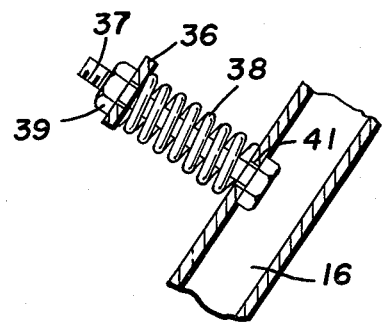

DISPLAY RACK

BACKGROUND OF THE INVENTION

In the retail sale of bakery goods and the like, it is common practice for the supplier of the goods to install a display rack in the retail store. The bakery goods are then carried into the store each day on trays which are inserted in the rack after the previous days supply has been removed. The presence of the bakery employee in the retail store cluttering up the aisle with his trays while he makes this transfer is less than desirable. This is particularly true in those stores which specialize in the sale of large quantities of standard goods with a minimum of frills. Such stores usually have narrow aisles and displays of large quantities of various goods; the store owner is unlikely to enjoy seeing the bakery goods employee working in the aisles. Furthermore, in his haste to get in and out of the retail store, the bakery goods may not be placed in the rack in the most desirable and attractive pattern. Other mistakes, such as failure to remove stale merchandise, can also take place when the bakery employee feels that he must perform his in-and-out operation in the shortest possible time. In addition, his truck occupies space in the unloading area at the rear of the store or at a loading dock for a long period of time. These and other difficulties experienced with the prior art devices have been obviated in a novel manner by the present invention.

It is, therefore, an outstanding object of the invention to provide a display rack especially designed to take part in a novel procedure for introducing merchandise into a retail establishment.

Another object of this invention is the provision of a display rack occupying less space than conventional racks and offering no unsafe features that could damage the purchasing public.

A further object of the present invention is the provision of a display rack which is inexpensive to manufacture, which is easy to operate, and which is capable of a long life of useful service.

It is another object of the instant invention to provide a display rack in which a single actuating handle serves not only to move the shelves into display position and lock them there but also at the same time to place a brake in position.

It is another object of the instant invention to provide a display rack in which the shelves are horizontal during transport, so that the articles of merchandise will not press against one another, and in which the shelves can be inclined for display of the goods.

With these and other objects in view, as will be apparent to those skilled in the art, the invention resides in the combination of parts set forth in the specification and covered by the claims appended hereto.

SUMMARY OF THE INVENTION

In general, the invention consists of a display rack having a frame on which are mounted for pivotal movement a series of vertically-arranged tray supports. A vertical actuating bar joins all of the tray supports by pivotal attachments and an actuating handle (which is pivotally mounted on the frame) is connected to the actuating bar to move it from an upper position in which all of the tray supports are horizontal to a lower position in which all of the tray supports are inclined.

More specifically, a brake foot is connected to the lowermost tray support and is in contact with the floor when the tray is in its inclined condition. The lowermost tray support is also pivotally attached to the frame at a point midway between the front and the rear. The brake foot is pivotally attached to the tray support and is spring-biased to compensate for irregularities in the floor. The geometry of the actuating handle and the pivotal connection to the frame are selected so that (in the lower display position) the handle lies horizontally against the horizontal edge of the frame and (in the upper transportation position) the handle lies vertically against a vertical edge of the frame.

BRIEF DESCRIPTION OF THE DRAWINGS

The character of the invention, however, may be best understood by reference to one of its structural forms, as illustrated by the accompanying drawings, in which:

FIG. 2 is a vertical sectional view of the display rack, taken on the line II—II of FIG. 1, FIG. 3 is an enlarged front elevational view of a portion of the rack, FIG. 4 is an elevational view of a portion of the rack as viewed from the inside thereof, FIG. 5 is a horizontal sectional view taken on the line V—V of FIG. 4, FIG. 6 is a vertical sectional view of the lower part of the rack, and FIG. 7 is an enlarged view of a portion of the rack shown in FIG. 6.

DESCRIPTION OF THE PREFERRED EMBODIMENT

Figure 1:
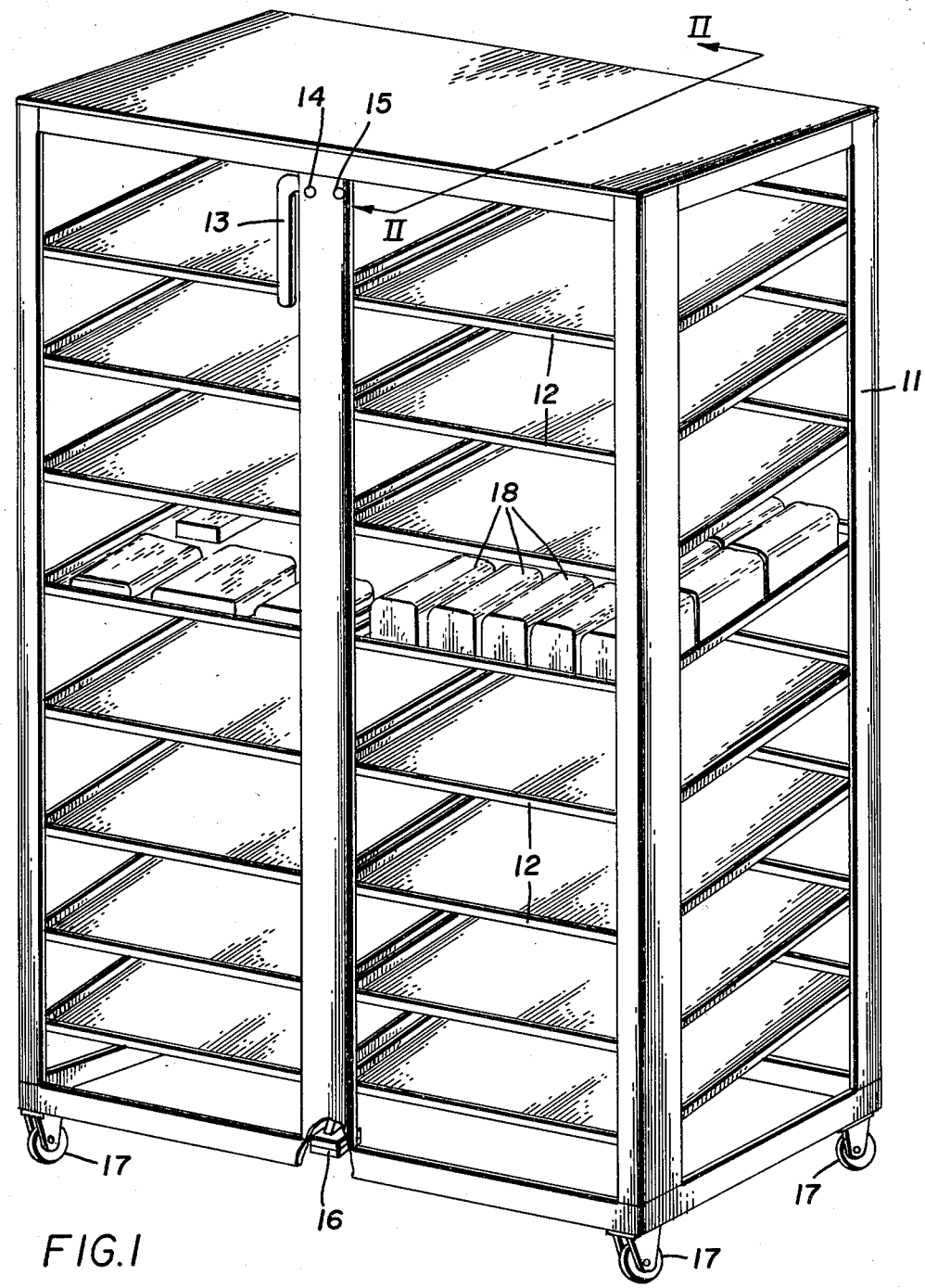
FIG. 1 is a perspective view of a display rack incorporating the principles of the present invention.

Referring first to FIG. 1, wherein are best shown the general features of the invention, it can be seen that the display rack, indicated generally by the reference numeral 10, is provided with a metal frame 11 on which are mounted a series of tray supports 12. The tray supports are mounted one above the other for tilting movement about horizontal axes located midway between the front and the rear of the rack.

Pivotally mounted on the upper central part of the rack is an actuating handle 13, the handle being mounted on a pivot 14 for swinging action in a plane parallel to and slightly behind the front of the rack. A lock pin 15 serves to lock the handle during transportation or shipment. Extending from the bottom of the rack are wheels 17, one located at each corner thereof, and extending from the central portion of the bottom is a brake foot 16. Lying in the tray supports are shown trays carrying baked goods 18, such as loaves of bread.

Referring next to FIG. 2, it can be seen that an actuating bar 19 extends vertically through the rack adjacent the front thereof and is pivotally connected to each of the tray supports 12. A similar bar 21 extends vertically of the rack and is pivotally attached to the rear of each of the tray supports 12. The actuating handle 13 is pivotally connected to the actuating bar 19 to move it from an upper transportation position in which all of the tray supports are horizontal to a lower display position in which all of the tray supports are inclined.

The lowermost tray support 12 is pivotally attached to the frame at a point which is midway between the front and the rear and substantially below the level of the pivotal attachments to the bars 19 and 21 when the tray support is in the horizontal condition. This takes place through the medium of a pivot pin 23 extending through the tray support and through an upstanding abutment 22 forming part of the frame. The uppermost tray support is connected to the frame through the medium of a pivot 26 which extends through a vertical slot 25 in a downwardly-directed locating element 24, which is also connected midway between the front and the rear of the track. The pivot point at the pin 26 is substantially below the level of the pivotal attachments to the bars 19 and 21 when the tray support is horizontal. Also, evident in this view, is the fact that the brake foot 16 is pivotally connected to the lowermost tray support 12 at a point between its midpoint which is attached to the support element 22 and the front pivotal attachment to the actuating bar 19.

FIG. 3 shows the manner in which the actuating handle 13 is mounted on the frame for pivotal movement about the pivot 14 in such a way that its elongated grasping portion lies parallel to and close to a horizontal edge 43 of the frame when the rack is in the operative display condition with the tray supports inclined downwardly. The handle is movable to a vertical position in which it lies close to a vertical edge 44 of the frame when the rack is in its inoperative transportation condition with the tray supports all raised to a horizontal position. At that point the locking pin 15 serves to prevent the handle from being moved so that the rack remains in transportation position despite rough handling.

FIG. 4 shows the actuating handle 13 as viewed from the inside of the rack. It shows the manner in which it is pivotally attached to the frame at the pivot 14 and how it is attached to the actuating bar 19 through the link 27. The actuating handle 13 is in the form of a bell crank having two legs and the pivot 14 is located at the junction between the legs. One end of the link 27 is attached by a pivot 28 to the inner leg of the actuating handle, while the other end is connected by a pivot 29 to the vertical actuating bar 19. The geometry of the actuating handle and the pivotal connection to the frame are obvious in this view and show the manner in which it is movable from its horizontal position against the edge 43 of the frame to its vertical position in which it lies against the edge 44. In this view it is shown that the actuating bar 19 consists of two parallel angle irons that are tied together and have flanges 31 and 33. The flange 31 is pivotally attached to adjacent tray support 21 by a pivotal bolt 32, while the flange 33 is attached to its tray support 12 by a similar pivot bolt 34, these being illustrative of all the pivotal connections between the tray supports and the actuating bar.

In FIG. 5 it can be seen that suitable space exists between the actuating bar 19 and the frame 11 to allow the actuating handle 13 and the link 47 to pivot.

In FIG. 6 it can be seen that the brake foot 16 consists of an elongated arm pivotally attached at one end by a pivot 35 to the lowermost of the tray support 12. At the other end it carries a friction pad 42. A coil spring 38 extends between the tray support and the arm at an intermediate part thereof to compensate for irregularities in the floor on which the rack rests.

FIG. 7 shows the details of the brake foot including the manner in which a bolt 37 extends through an aperture 41 in a flange on the leg and through a flange 36 welded to the tray support where its end is provided with a nut 39. The bolt is, therefore, capable of moving through the apertures in its flanges as the foot is moved to a smaller angle to the tray support due to pressure against the friction pad 42 with the resultant compression of the spring 38.

The operation and the advantages of the present invention will be readily understood in view of the above description. When the trays are in their upper horizontal position, the actuating handle lies vertically against the vertical edge 42 of the frame (as shown in FIG. 3). In this position the friction foot 16 is also lifted from the floor and the entire assemblage may be locked by the use of the lock pin 15 through a suitable aperture in the actuating handle. In this condition the baked goods 18, not only do not fall out of the rack during transportation, but they do not press against one another as might be true if the rack supports were inclined. The baked goods 18 are inserted onto the tray supports in trays at the bakery. They are then loaded on the delivery trucks. When the truck arrives at the retail establishment, the entire rack with the goods in place is rolled into the delivery entrance of the establishment. If a dock is provided, the rack moves across a dock plate onto the dock and then on the same level into the establishment. On the other hand, if the main floor of the establishment is on the level with the delivery area, it may be necessary to use a lift to lower the rack from the delivery truck onto the ground, from which point it is wheeled into the establishment. In order to prevent both the "old" and the "new" racks from being in the establishment at the same time (and, therefore, cluttering up the aisle) it may be preferable to remove the old rack from its position and bring it to the rear of the establishment beside the truck. At that time the new loaded rack is moved into place in the establishment and placed in its position on the aisle. At that point, the locking pin 15 is removed and the actuating handle is moved to a horizontal position. This causes the actuating bar 19 to move downwardly and to move the tray supports into an inclined position. At the same time, the brake foot is brought into contact with the floor, so that the rack is not capable of being moved. The old rack with (perhaps) stale bakery goods, is moved into the delivery truck and is carried back to the bakery for use at a later time.

It should be noted that there are certain advantages to be gained by locating the pivot pins 23 and 26 substantially below the points of attachment of their respective tray supports 12 to the bars 19 and 21. This geometric arrangement means that, when the tray support is moved into the inclined condition, the bars 19 and 21 remain in substantially the same distance from the front and rear of the frame, respectively. This allows them to be located close to the frame to prevent a person from inserting his fingers into the gap between the bar and frame and being pinched by tray support movement. It also permits the use of the relatively simple linkage mechanism of FIG. 4.

It can be seen, then, that by use of the present rack, it is possible to deliver bakery goods to the retail establishment with a minimum of congestion in the aisles and with a minimum of "portal-to-portal" time within the establishment itself, since no transfer of bakery goods from one rack to another takes place. The structure is quite simple and foolproof and, therefore, is quite capable of being manufactured and sold at a relatively low cost. It is free of unsafe features either for the bakery personnel or for the customer. Because of the fact that the actuating handle carries out not only the inclination of the tray supports, but also puts the brake foot in place, it is impossible for the delivery man to leave the display in condition without also locking it in place on the floor.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Display rack, comprising
   a. a frame having a plurality of supporting wheels,
   b. a series of tray supports mounted one above the other on the frame for tilting movement,
   c. a vertical actuating bar to which each of the tray supports is pivotally attached,
   d. an actuating handle pivotally mounted on and lying entirely within the frame and connected to the actuating bar to move it from an upper position in which all of the tray supports are inclined, the actuating bar and handle being located at the side of the frame at which the lower edges of the tray supports are located, and
   e. a brake foot directly attached to the lowermost tray support and movable with it into contact with the floor when the actuating bar is in the said lower position.

2. Display rack as recited in claim 1, wherein the lowermost tray support is pivotally attached to the frame at a point which is midway between the front and the rear and substantially below the pivotal attachment to the actuating bar.

3. Display rack as recited in claim 1, wherein the uppermost tray support is connected by a pivot to the frame at a point midway between the front and rear and the pivot passes through a vertical slot and substantially below the pivotal attachment to the actuating bar.

4. Display rack as recited in claim 1, wherein the brake foot consists of an elongated arm pivotally attached at one end to the said lowermost tray support and carrying a friction pad at the other end, a spring extending between the tray support and the arm at an intermediate part thereof to compensate for irregularities in the floor.

5. Display rack as recited in claim 1, wherein an elongated link connects the actuating handle to the actuating bar, wherein the actuating handle is in the form of a bell crank having two legs, and wherein the pivotal connection to the frame is located at the junction between the legs.

6. Display rack as recited in claim 5, wherein the geometry of the actuating handle and the pivotal connection to the frame are selected so that in the lower display position the handle lies horizontally against a horizontal edge of the frame and in the upper transportation position the handle lies vertically against a vertical edge of the frame.

* * * * *